Aug. 27, 1935.          J. ROCKMAN          2,012,773
TIRE PRESSURE CONTROL
Filed May 31, 1933
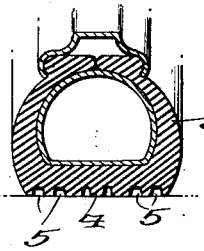
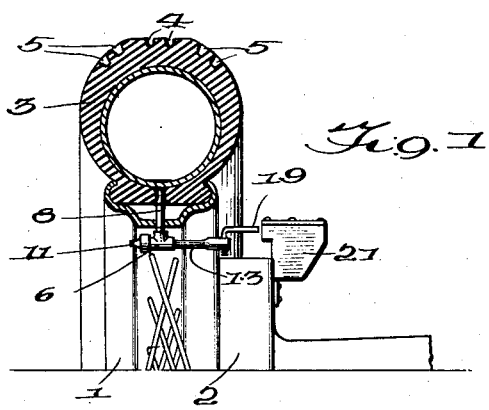
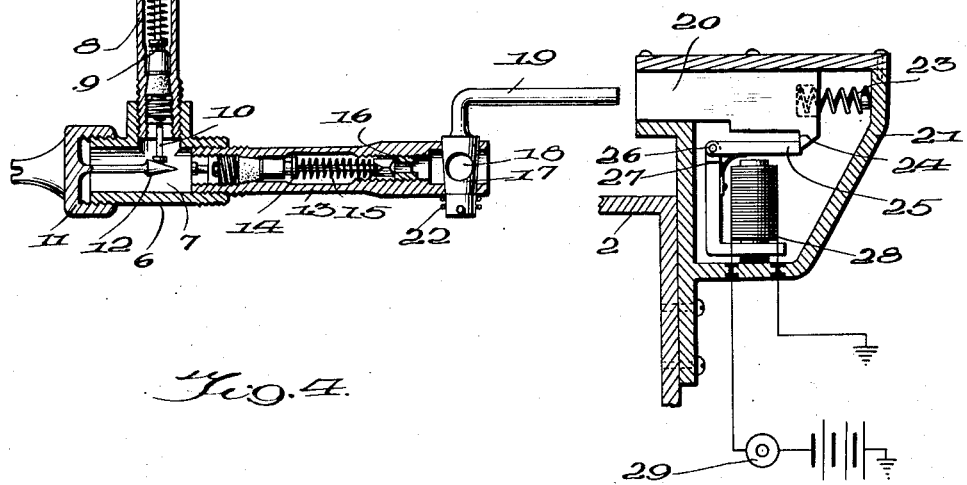
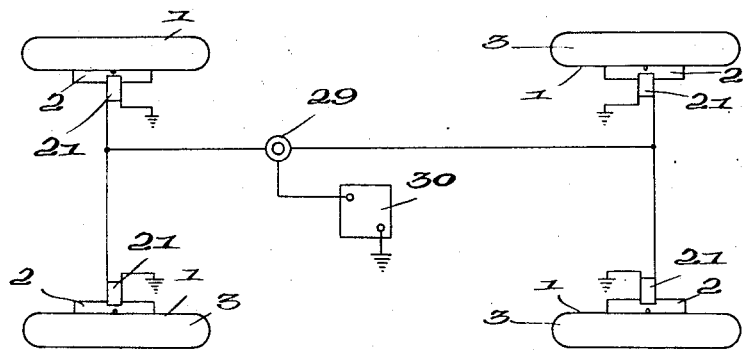
INVENTOR
Joseph Rockman
BY
ATTORNEY Patented Aug. 27, 1935

2,012,773

UNITED STATES PATENT OFFICE 2,012,773

TIRE PRESSURE CONTROL

Joseph Rockman, Sayre, Pa.

Application May 31, 1933, Serial No. 673,739

21 Claims. (Cl. 152—11)

This invention relates to a mechanism for causing an increase in the traction surface or surfaces of vehicle tires in order to provide an increased grip between the tires and the road. This is desirable, especially on slippery or icy surfaces which render traction very poor and prevent positive control of the vehicle by the brakes thereof.

It is the object of my invention to provide for an increase in the traction of the vehicle, as by deflating the tires which increases the traction area to a predetermined extent, under the control of the operator, in order to give increased traction for the vehicle. The operator may control the deflation of the tires from the driver's seat, and preferably control all of the tires simultaneously, even when the vehicle is in motion. When the vehicle approaches a hill, it is very often difficult to determine whether or not the road is slippery on the hill until the hill is actually reached and the car begins to skid, but with this invention the operator may release part of the air in the tires to a predetermined degree without stopping the vehicle, so as to give the vehicle increased traction so as to prevent or substantially reduce skidding.

One feature of my invention involves the construction of a novel form of tire having the usual anti-skid tread surface, but arranged at the opposite side edges thereof are one or more rows of vacuum cups of the type which have previously been used over the entire surfaces of tires. Under normal conditions, these vacuum cups would be raised out of contact with the road surface, because with the tire inflated to its normal degree, the vehicle would ride on the standard anti-skid tread surface, but when the tire is deflated to a predetermined degree, the vacuum cups are brought down into contact with the surface of the road. This increases the traction area of the tire and brings the vacuum cups into operation, utilizing their suction effects for holding the tire against skidding and providing better control of the vehicle.

In the accompanying drawing,

Fig. 1 is a partial sectional view through a vehicle wheel and tire, showing my invention applied thereto, partly in side elevation;

Fig. 2 is a sectional view through the tire deflated;

Fig. 3 is a sectional view through the pressure control; and

Fig. 4 is a diagrammatic view showing the wiring system for the wheels.

I have shown my invention applied to the control of the pneumatic tire of a motor vehicle. The wheels are designated generally by the numeral 1, while the brake drums therefor are shown at 2. Each of the wheels has a pneumatic tire which is preferably of the character shown in Figs. 1 and 2, having a normal tread or traction surface 4, which is of substantial width and is of the usual anti-skid character, being provided with grooves therein of suitable or desired shapes, such for instance, as diamonds, in order to provide an effective anti-skid normal traction surface for the tire. On opposite sides of the traction surface 4, are arranged special anti-skid elements, shown as vacuum cups 5, so arranged with respect to the normal tread surface 4, that these vacuum cups are normally out of contact with the road when the tire is inflated to this normal pressure. These vacuum cups may be in one or more rows, and of the character heretofore used over the entire tread surface of one commercial type of tires, known as the "Pennsylvania Vacuum-Cup" tire.

While this form of tire is preferred, yet it is not essential to this invention, because any desired form of antiskid tire may be used having a non-skid surface extending around the tire a sufficient distance to increase the tread surface when the tire is deflated.

When the tire is deflated to a predetermined degree, the weight on the tire will cause the tire to spread out, bringing the vacuum cups down into contact with the road, increasing the tread surface of the tire, so as to provide greater traction for the vehicle.

In order to provide for the deflation of the tires of the vehicle, I have provided mechanism under the control of the operator for deflating the tires to a predetermined degree at will. This mechanism is shown in Fig. 3.

A T 6, has a passageway 7 therein communicating with the tire through the usual valve stem 8, which is controlled by the usual spring-pressed valve 9, which is opened by a plunger 10. The T is screwed onto the outer end of the valve stem 8, and one end of the passageway 7 is closed by a cap 11, carrying a pin 12, which has a conical head in position to engage the plunger 10 to open the valve 9, as long as the cap 11 is in place.

The opposite side of the T 6, receives a tube 13, which is screwed therein, and has a valve 14 similar to the valve 9, and likewise having a spring 15, bearing thereagainst tending to seat said valve. The tube 13 has a sleeve 16, screwed therein and acting on the spring 15, so that by adjusting the sleeve 16, the tension of the spring 15 may be varied in order to vary the closing of the valve 14.

The outer end of the tube 13 has a valve 17 therein, provided with a port 18, adapted to register with the longitudinal opening through the tube 13 when the valve is turned to one position in order to open said tube to the atmosphere. The valve 17 is provided with an arm 19 thereon, for turning said valve.

In order to provide for opening the valve 17 to release the pressure in the tire when desired, I have shown a plunger 20, slidably mounted in a casing 21, carried by a stationary part of the vehicle, such for instance, as the stationary part of the brake drum 2, so that when the plunger 20 is projected outwardly, it lies in the path of the arm 19, as the latter rotates with the wheel and upon engagement of said plunger by the arm 19, the arm causes a turning of the valve 17, sufficiently to bring the port 18 into registry with the opening through the tube 13, and if desired, a torsion spring 22, may be used, provided with suitable stops for regulating the proper turning movement of the valve 17, upon engagement of the arm 19 with the plunger 20. The spring 23, bearing against an end of the plunger normally tends to press the plunger outwardly, but the plunger is held in a retracted position by engagement of a shoulder 24 thereof, with the end of an armature 25, which armature is pivoted at 26 and a spring 27 normally tends to press the armature upwardly to engage the forward side of the shoulder 24.

An electro-magnet 28 is arranged under the armature 25 for attracting said armature when energized, in order to pull the armature downward out of engagement with the shoulder 24, and thereby release the plunger 20 to permit the latter to be pressed outward by the spring 23. As stated above, this will cause the arm 19 to engage the plunger 20 as the wheel rotates and thereby turn the valve 17 to an open position.

In order to simultaneously actuate the mechanisms for all four wheels, as may be desired, I have provided a single impulse push-button switch 29, for closing a circuit from a battery 30 to the electro-magnets 28, at all of the wheels.

If it should be desired to render the mechanism inoperative for one or more of the wheels, it is only necessary to replace the cap 11, with a standard form of valve cap which does not have the pin 12, and which therefore permits the valve 9 to be normally closed so as to render the mechanism ineffective for such tire or tires.

In the arrangement shown in Fig. 3, the valve 9 will be held open normally by the pin 12, while the valve 14 will normally be held open by the normal pressure in the tire which acts thereon to unseat said valve.

With the valve 17 normally closed, the tube 13 is normally in open communication with the interior of the tire so that when the valve 17 is opened, the air in the tire escapes to the atmosphere through the tube 13 and port 18 of the valve 17 until the tire has been deflated to an extent such that the spring 15 counterbalances the pressure of the tire and closes the valve 14 which prevents any further deflation. The extent to which the tire is deflated may be regulated by adjusting the sleeve 16, but it should be deflated sufficiently to bring the vacuum cups 5 down into contact with the surface of the road as shown in Fig. 2, when that form of tire is used, or in other words to substantially increase the traction area of the tire. Ordinarily, a deflation from a normal pressure of approximately thirty-six pounds to a deflated pressure of twenty pounds will be sufficient but this will depend on the character of tire used and the extent of deflation should be determined accordingly by adjusting the sleeve 16.

I claim:

1. In a vehicle, the combination of traction surface having controllable means carried directly thereby, and power-actuated means for uniformly varying the transverse extent of the road contact of said traction surface.

2. In a vehicle, the combination of traction surface having controllable means carried directly thereby, and power-actuated means for uniformly varying to a substantial degree the transverse area of the road contact of said traction surface.

3. In a vehicle, the combination of traction surface having controllable means carried directly thereby, and operator-controlled power-actuated means for substantially increasing uniformly the transverse extent of the road contact of said traction surface.

4. In a vehicle, the combination with a wheel having a pneumatic tire, and pressure controlling means carried directly thereby, of power-actuated means for operating said pressure controlling means for deflating said tire to a predetermined pressure.

5. In a vehicle, the combination with a wheel having a pneumatic tire, and controllable deflating means carried directly thereby, of power-actuated means for controlling said deflating means while the vehicle is in motion.

6. In a vehicle, the combination of traction surface having controllable means carried directly thereby, power-actuated means for uniformly varying the transverse extent of the road contact of said traction surface, and means for regulating the actuation of said power means.

7. In a vehicle, the combination of controllable traction surface having deflating means carried directly thereby, and electrically actuated means for varying the extent of the road contact of the traction surface.

8. In a vehicle, the combination of a pneumatic tire having a valve-stem, means carried directly by the valve-stem for deflating said tire to a predetermined pressure, and electrical means for controlling said deflating means.

9. In a vehicle having wheels and pneumatic tires thereon having valve-stems, the combination of means carried directly by the valve-stems for controlling the deflation of the tires to a predetermined degree, and electrically-actuated means controlled from a remote point of the vehicle for controlling the actuating of said first-mentioned means.

10. In a vehicle having a pneumatic tire provided with a valve-stem, the combination of means carried directly by the valve-stem for controlling the deflation of the tire, a movable device for actuating said controlling means, and electrically actuated means for controlling the actuation of said movable device.

11. In a vehicle having a pneumatic tire, the combination of means for controlling the deflation of the tire, a plunger for actuating said means, and electrically actuated means for controlling the actuation of the plunger.

12. In a vehicle having a pneumatic tire, the combination of a valve for controlling the deflation of the tire and having an arm for moving said valve, a plunger arranged in position to engage said arm to cause a movement of the valve, resilient means bearing against the plunger and normally tending to move the plunger, and electro-magnetic means for controlling the release of the plunger.

13. In a vehicle, the combination of a wheel having a pneumatic tire thereon having a valve stem, power actuated means carried directly by the valve-stem for deflating the tire to a predetermined pressure, and means for controlling the actuation of said power actuated means while the wheel is rotating.

14. In an automobile, the combination of a plurality of pneumatic tires having valve-stems, deflation controlling means applied to each of said tires and carried directly by the valve-stems of the tires, and common means for causing actuating of said plurality of controlling means.

15. In a vehicle, the combination of a pneumatic tire, and automatic deflating means carried by said tire and controllable means cooperating with said automatic means, said automatic and controllable means being arranged in series and coacting to deflate said tire to a predetermined pressure.

16. In a vehicle having a pneumatic tire, the combination of a valve for controlling the pressure in the tire, resilient means acting on said valve normally tending to close said valve, means for adjusting the tension of said resilient means, a secondary valve arranged in series with said first mentioned valve for controlling the deflation of the tire, and means for positively opening said secondary valve.

17. In a vehicle having a pneumatic tire, the combination of a valve for controlling the pressure in the tire, resilient means acting on said valve normally tending to close said valve, means for adjusting the tension of said resilient means, secondary means arranged in series with said valve for controlling the deflation of the tire, and means for causing actuation of said secondary means upon rotation of the tire.

18. In a vehicle having a wheel and a pneumatic tire thereon, the combination of means carried by the wheel for controlling the deflation of the tire, said means including an arm, a plunger carried by a stationary part of the vehicle, means for holding said plunger normally in a retracted position, and means for projecting the said plunger into position to engage the arm upon rotation of the wheel for actuating said deflation means.

19. In a vehicle having a wheel and pneumatic tire having a valve-stem, the combination of means carried directly by the valve-stem for causing a deflation of the tire, said means having an actuating member, and means carried by a stationary part of the vehicle in position to cooperate with said actuating member upon rotation of the wheel for causing actuation of said deflation means.

20. In a vehicle having a wheel and pneumatic tire, the combination of a valve for controlling the deflation of the tire, an arm for moving said valve, a plunger arranged in position to engage said arm to cause a movement of the valve, and means for moving said plunger into position to engage said arm.

21. In a vehicle, the combination of a pneumatic tire having a valve stem, means carried directly by the valve stem for exhausting the air from the tire, electrical means for controlling said exhausting means, and means for automatically stopping the air exhaust when the tire is deflated to a predetermined pressure.

JOSEPH ROCKMAN.